(12) United States Patent
Gerring et al.

(10) Patent No.: US 12,044,288 B2
(45) Date of Patent: *Jul. 23, 2024

(54) HIGH-EFFICIENCY BELT AND METHOD OF MANUFACTURING THE SAME

(71) Applicant: GATES CORPORATION, Denver, CO (US)

(72) Inventors: Douglas Gerring, Denver, CO (US); Kyle Spring, Denver, CO (US); Tom Moss, Denver, CO (US)

(73) Assignee: Gates Corporation, Denver, CO (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/374,950

(22) Filed: Jul. 13, 2021

(65) Prior Publication Data

US 2021/0341035 A1 Nov. 4, 2021

Related U.S. Application Data

(63) Continuation of application No. 17/019,147, filed on Sep. 11, 2020, now Pat. No. 11,092,210, which is a continuation of application No. PCT/US2019/053644, filed on Sep. 27, 2019.

(60) Provisional application No. 62/737,517, filed on Sep. 27, 2018.

(51) Int. Cl.
*F16G 1/28* (2006.01)
*B29D 29/10* (2006.01)
*F16G 1/08* (2006.01)
*B29L 31/00* (2006.01)

(52) U.S. Cl.
CPC ............ *F16G 1/28* (2013.01); *B29D 29/106* (2013.01); *F16G 1/08* (2013.01); *B29L 2031/7094* (2013.01)

(58) Field of Classification Search
CPC .................................. F16G 1/08; F16G 1/28
USPC ............................................................ 474/205
See application file for complete search history.

(56) References Cited

U.S. PATENT DOCUMENTS

| | | | | |
|---|---|---|---|---|
| 3,416,383 A * | 12/1968 | Brooks | ............ | F16G 1/10 474/263 |
| 4,721,498 A * | 1/1988 | Grob | ............ | B62D 55/24 474/261 |
| 4,786,274 A * | 11/1988 | Robecchi | ............ | F16G 1/08 428/113 |
| 5,575,729 A * | 11/1996 | Feldmann | ............ | B62D 55/244 474/260 |
| 9,169,897 B2 * | 10/2015 | Fujikawa | ............ | F16G 5/20 |

(Continued)

*Primary Examiner* — Michael R Mansen
*Assistant Examiner* — Mark K Buse
(74) *Attorney, Agent, or Firm* — Kevin J. Aiken, Esq.

(57) ABSTRACT

A high efficiency belt having reduced bending stiffness while maintaining a high coefficient of friction. The belt includes a backing layer, a rib material layer, and cords embedded within, wherein the coefficient of friction of the high efficiency belt is greater than or equal to 0.03 mm/N times the bending stiffness for belts having a thickness in the range of from 2.6 mm to 4.2 mm. The belt can include a bending stiffness in the range of from about 30 N/mm to about 65 N/mm and an anisotropic modulus of elasticity ratio of between 1.1 and 5.0. Methods of manufacturing the high efficiency belt are also described and can include forming sheets of rib material with parallel aligned reinforcement fibers transverse to the direction of rotation of the high efficiency belt.

16 Claims, 10 Drawing Sheets

(56) References Cited

U.S. PATENT DOCUMENTS

| | | | | |
|---|---|---|---|---|
| 9,322,455 | B2* | 4/2016 | Di Meco | F16G 1/28 |
| 10,309,487 | B2* | 6/2019 | Okubo | F16G 1/00 |
| 10,550,913 | B2* | 2/2020 | Yoshida | B32B 25/04 |
| 11,092,210 | B2* | 8/2021 | Gerring | F16G 1/08 |
| 2009/0048049 | A1* | 2/2009 | Yoshida | F16G 5/06 |
| | | | | 474/264 |
| 2009/0062050 | A1* | 3/2009 | Hayashi | F16G 5/04 |
| | | | | 474/167 |
| 2010/0167861 | A1* | 7/2010 | Shiriike | F16G 1/08 |
| | | | | 474/263 |
| 2016/0040749 | A1* | 2/2016 | Kageyama | B32B 3/30 |
| | | | | 474/8 |
| 2016/0208890 | A1* | 7/2016 | Nonaka | C08J 3/203 |
| 2017/0009847 | A1* | 1/2017 | Mitsutomi | D04B 21/20 |
| 2017/0284504 | A1* | 10/2017 | Mitsutomi | F16G 5/08 |
| 2018/0223953 | A1* | 8/2018 | Harada | B32B 3/30 |
| 2018/0244906 | A1* | 8/2018 | Feng | C08L 23/16 |

\* cited by examiner

|  | Power Loss [mW] | | |
| --- | --- | --- | --- |
|  | 50 mm Dia. Pulley | 72 mm Dia. Pulley | 120 mm Dia. Pulley |
| Efficiency Belt | 55 | 56 | 40 |
| Standard Production Belt | 89 | 84 | 62 |
| Difference | 34 | 28 | 22 |
| % Difference | 38% | 33% | 35% |

FIGURE 7

HIGH-EFFICIENCY BELT AND METHOD OF MANUFACTURING THE SAME

The present application is a continuation of U.S. application Ser. No. 17/019,147 filed Sep. 11, 2020, which claims priority to International Application No. PCT/US2019/053644 filed Sep. 27, 2019, which claims the benefit of and priority to U.S. Provisional Patent Application No. 62/737,517, titled "HIGH EFFICIENCY BELT AND METHOD OF MANUFACTURING THE SAME" and filed Sep. 27, 2018, the entirety of each of which is hereby incorporated herein by reference.

TECHNICAL FIELD

The present application relates to belts for use in, for example, automobile power transmissions, and more specifically, belts having improved efficiency in terms of reduced energy required to turn the belt as compared to previously known belts, and without sacrificing other performance characteristics of the belt, such as durability and power transmission capability.

BACKGROUND

Previously known belts used in, for example, automobile power transmissions, require a certain amount of energy in order to turn the belt. The energy consumption is typically in the form of hysteretic heat generation and additional fuel consumption from increased torque to turn the belt. Belts requiring lower amounts of energy to turn the belt are desirable for a variety of reasons. For example, a belt requiring less energy to turn results in improved fuel economy and reduced emissions, both of which are highly valued in vehicle design.

The energy efficiency of a belt (i.e., the amount of energy required to turn a belt) depends on numerous different characteristics of the belt, including, but not limited to, the materials used in the belt, the mass of the belt, the thickness of the belt, and the bending stiffness of the belt. When manufacturing such belts, a cost-benefit analysis needs to be considered when changing or adjusting one or more of these types of parameters in an attempt to improve the efficiency of the belt. For example, a change in the materials used in the belt and/or a change in the thickness of the belt may beneficially lower the amount of energy needed to turn the belt but may also consequently lower the durability of the belt or have some other negative impact on the performance of the belt. Adjusting some characteristics of the belt may have competing impacts (i.e., a positive impact on one aspect of the belt and a negative impact on another aspect of the belt). Reducing belt thickness, for example, may beneficially lower the bending stiffness of the belt and thereby make the belt easier to turn, but may also lower the coefficient of friction and thereby require more energy to turn a belt due to lowered torque transfer. As such, a need exists for belts that require less energy to turn the belt while also not degrading other important characteristics of the belt, such as those relating to performance and durability. A need also exists for methods of manufacturing such high efficiency belts.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present application describes various embodiments related to belts that have higher energy efficiency than previously known belts and without diminishing other characteristics of the belt, as well as embodiments for manufacturing such belts. In some embodiments, the high efficiency belt comprises a backing layer, a rib material layer disposed on the backing layer, and cords embedded within the rib material layer, wherein the belt has a coefficient of friction that is greater than or equal to 0.03 mm/N times the bending stiffness of the belt, such as a coefficient of friction that is greater than or equal to 0.04 mm/N times the bending stiffness. Other features of the belt product can include a thickness in the range of about 2.6 mm to about 4.2 mm, such as between about 3.0 and about 3.8 mm, a bending stiffness in the range of from about 30 N/mm to about 65 N/mm, and an anisotropic modulus of elasticity ratio of between 1.1 and 5.0. Still other features of the belt can include a backing layer surface having a finned heat exchanger design, which helps to expand the ambient operational temperature range for the disclosed high efficiency belt.

In some embodiments, the method of making the high efficiency belt generally includes a step of mixing together various raw ingredients, a step of milling or extruding the mixture to form a sheet, a step of calendering the sheet to form a calendered sheet, a step of bannering together segments of the calendered sheet, a step of slab building a composite belt structure on a mold, the composite belt structure including the bannered sheet material, a step of curing the composite belt material in the mold, and various optional post-processing steps to create a desired finished belt product from the cured material. In some embodiments of the above described process, specific raw ingredients are used in specific amounts so as to create a sheet material having anisotropic properties with respect to the modulus of elasticity. In some embodiments, the calendering process is used to uniformly align the reinforcement material in the sheets. In some embodiments, the bannering step calls for bannering together individual sheets such that all reinforcement materials are aligned in the same direction, and more specifically, aligned in the non-bending direction of the belt.

These and other aspects of the high efficiency belt described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed high efficiency belt, including the preferred embodiment, are described with reference to the following figures, wherein like reference numerals refer to like parts throughout the various views unless otherwise specified.

FIG. 7 is a chart showing power loss of belts in accordance with various embodiments described herein as compared to previously known belts at various pulley diameters.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
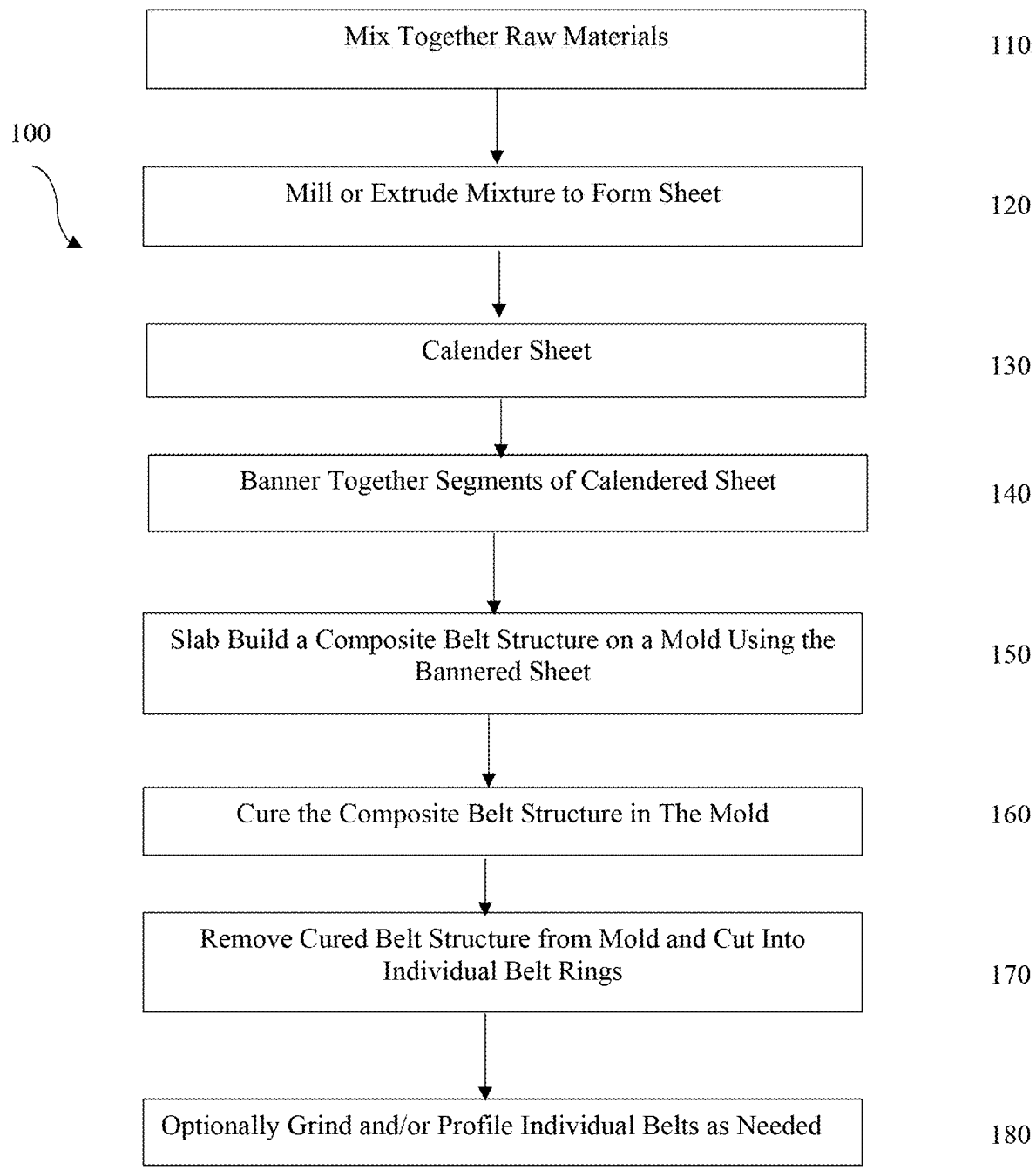
FIG. 1 is a flow chart illustrating a method of manufacturing a high efficiency belt according to various embodiments described herein.

With reference to FIG. 1, a method 100 of manufacturing a high efficiency belt generally includes a step 110 of mixing together raw ingredients; a step 120 of milling or extruding the mixture to form a sheet; a step 130 of calendering the sheet; a step 140 of bannering together several sheets of the calendered sheet; a step 150 of slab building a belt on a mold using at least the bannered sheet; a step 160 of curing the belt structure in the mold; a step 170 of removing a cured cylinder from the mold and cutting the cylinder into a plurality of individual belts; and an optional step of 180 of grinding and profiling the belt to its final dimensions (as necessary). The belt formed by the method illustrated in FIG. 1 is a high efficiency belt that requires less energy to turn than previously known belts with similar dimensions (e.g., thickness). Of particular focus, and as described in greater detail below, the high efficiency belt formed from the method illustrated in FIG. 1 has an anisotropic material construction with respect to its modulus of elasticity and an improved (i.e., reduced) bending stiffness, both of which contribute to the improved efficiency of the belt.

In step 110, raw ingredients are mixed together to form a mixture. The raw ingredients mixed together in step 110 generally include 1) base elastomer or rubber stock, 2) reinforcement material, 3) filler material, 4) oil, and 5) curatives. Plasticizers, antidegradants, colorants, process aids, coagents, and the like may also optionally be added.

In some embodiments, the mixing step 100 is generally carried out using an industrial mixer, such as a Banbury mixer, to mix together all raw ingredients. However, other mixing techniques and methods can be used. In some embodiments, the individual raw ingredients are added into the mixer in a specific sequence to ensure sufficient incorporation and dispersion of the raw ingredients. In some embodiments, certain raw ingredients can be mixed together prior to being added in sequence into the mixed. An exemplary, but non-limiting, mixing sequence that can be used includes first adding polymer, carbon black, and oil; then fibers and fillers; followed by curatives.

With respect to the rubber stock, any suitable rubber stock can be used. In some embodiments, the rubber stock is in the form of a powder, pellet, bale or block. Exemplary suitable rubber stock includes, but is not limited to, natural rubber, styrene-butadiene rubber (SBR), chloroprene rubber (CR), ethylene propylene elastomers (EPDM and EPM) and other ethylene-elastomer copolymers such as ethylene butene (EBM), ethylene pentene and ethylene octene (EOM), hydrogenated nitrile butadiene rubber (HNBR), and fluoroelastomers (FKM). In some embodiments, the amount of rubber stock used in step 110 is from 30 wt % to 70 wt % of the total weight of the mixed composition. In some embodiments, the rubber stock is from about 40 wt % to 60 wt % of the total weight of the mixed composition.

With respect to the reinforcement material, some embodiments of the method described herein use chopped fiber segments as the reinforcement material, though other reinforcement material can also be used, provided the reinforcement material is in the form of elongated segments. When chopped fibers are used, the chopped fibers may be, for example, aramid, polyester (PET), cotton or nylon. The chopped fibers may be made from either organic or synthetic material, or a mixture of organic and synthetic materials. The chopped fiber material may also be in the form of carbon fiber nanotubes. The dimensions of the chopped fibers used in step 110 are generally not limited. In some embodiments, the reinforcement material is high aspect ratio material having a length in the range of from 0.2 mm to 3 mm. In some embodiments, the reinforcement materials (e.g., chopped fibers) have an aspect ratio of from 10 to 250. In some embodiments, the amount of reinforcement material (e.g., chopped fiber) used in step 110 is from 5 wt % to 30 wt % of the total weight of the mixed composition. In some embodiments, the reinforcement material is from about 6 wt % to about 14 wt % of the total weight of the mixed composition.

With respect to the fillers, some embodiments of the method described herein use carbon black as the filler material, though other filler can be used, either alone or in conjunction with carbon black. Other fillers suitable for use in step 110 include, but are not limited to clays, pulps and silicas. In some embodiments, the amount of filler used in step 110 is from 5 wt % to 45 wt % of the total weight of the mixed composition. In some embodiments, the filler is from about 10 wt % to about 20 wt % of the total weight of the mixed composition.

With respect to the oil, the oil as a raw ingredient is generally provided as the liquid or binder material that allows for the mixing together of the other dry ingredients and the formation of a thick mixture that can be formed into a sheet. Any suitable oil can be used, including, but not limited to, aromatic, naphthenic, and paraffinic. In some embodiments, the amount of oil used in step 110 is from 2 wt % to 18 wt % of the total weight of the mixed composition. In some embodiments, the oil is from about 2 wt % to about 8 wt % of the total weight of the mixed composition.

With respect to curatives, any suitable curative material can be used, with the curatives assisting during curing step 150 described in greater detail below. Exemplary curatives suitable for use in step 110 include, but are not limited to, sulfur and peroxides. In some embodiments, the amount of curative used in step 110 is less than about 8 wt % of the total weight of the mixed composition, such as less than 5 wt %.

Table 1 sets forth exemplary weight percentage ranges for components of the mixture of step 110.

TABLE 1

| Material | Low (wt %) | High (wt %) |
|---|---|---|
| Rubber Stock | 40 | 60 |
| Reinforcement Material | 6 | 14 |
| ZDMA | 0 | 8 |
| Carbon Black | 10 | 20 |
| Clay | 0 | 6 |
| Silica | 0 | 5 |
| Oil | 2 | 8 |
| Others | 0 | 4 |
| Peroxide | 0 | 5 |

U.S. Pat. Nos. 5,610,217 and 6,616,558 provide additional information regarding material formulations and mixing methods for forming a mixture to be used in forming a belt, some or all of which may be used in the mixing step 110 described herein. U.S. Pat. Nos. 5,610,217 and 6,616,558 are therefore incorporated herein by reference in their entirety.

After mixing step 110 is carried out as described above, a milling or extruding step 120 is carried out to form a sheet from the mixture. Any standard milling or extruding techniques can be used. In some embodiments, the mixture is allowed to cool to room temperature before milling or extruding to form the sheet. The sheet formed has a relatively high surface area.

As a sheet is formed in step 120, a calendering step 130 is performed on the sheet. The calendering step 130 serves two primary purposes: reducing and precisely controlling the thickness of the sheet, and orienting the reinforcement material so that all high aspect ratio reinforcement material is aligned in the same direction within the sheet to thereby provide anisotropic material properties to the sheet (discussed in greater detail below).

Any known technique for calendering the material can be used, including passing the sheet material through rotating drums spaced apart a distance smaller than the thickness of the sheet material such that the thickness of the sheet material is reduced as it passes through the drums. In some embodiments, the calendering step 130 is used to reduce the thickness of the sheet produced in step 110 to within a thickness of from about 0.25 to 1.5 mm. The reduction in thickness to a target thickness helps to ensure that when the slab build process of step 150 (described in greater detail below) is carried out, the sheet can be wrapped around the cylindrical mold multiple times (e.g., 3 times) but still result in a cumulative thickness that is approximately the desired final thickness of the rib material section of the final belt product.

In order to achieve reinforcement material alignment from the calendering step 120, the calendering process may utilize shear, such as by operating the two drums at different angular velocities. For example, when the first (e.g., upper) drum has an angular velocity $\omega_1$ less than the angular velocity $\omega_2$ of the second (e.g., lower) drum, this difference in angular velocity applies shear to the sheet being passed through the drums, which results in the reinforcement material becoming aligned within the sheet. That is to say, all of the high aspect ratio reinforcement materials are aligned generally in parallel with each other within the sheet.

A result of aligning the reinforcement material in this manner is that the resulting calendered sheet has anisotropic properties with respect to the modulus of elasticity. Generally speaking, the sheet has a first modulus of elasticity in the "with-grain" direction (high shear) and a second modulus of elasticity in the "cross-grain" direction. Taken together, the sheet can be considered to have a modulus of elasticity ratio, the ratio being the modulus in the with-grain direction to the modulus in the cross-grain direction. In some embodiments, the sheet produced in step 110 has a modulus ratio of from 1.1 to 5.0.

Figure 2:
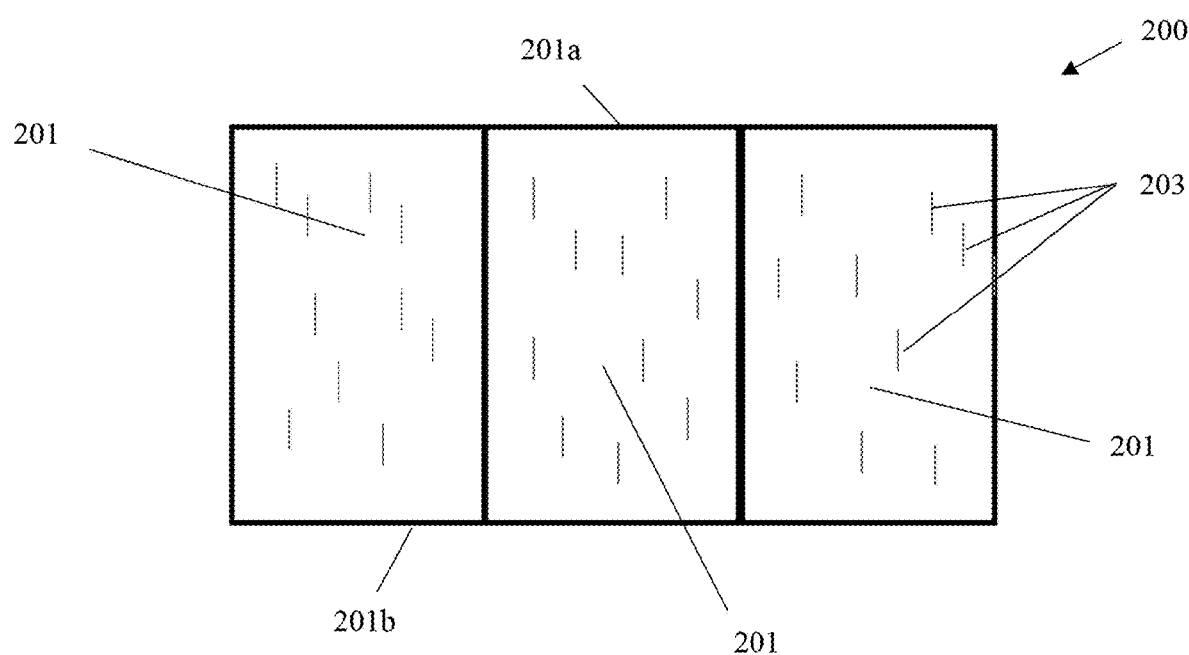
FIG. 2 is a schematic view of the bannering step used in the manufacturing method according to various embodiments described herein.

In step 140, the individual sheets formed from steps 120 and 130 are joined together (sometimes referred to as bannered together). As used herein, the term bannering refers to the end-to-end patching together of individual sheets of calendered sheet material to thereby form a new, larger sheet. FIG. 2 illustrates the result of this bannering process, in which multiple individual sheets 201 are patched together to form a composite (i.e., bannered) sheet 200. In some embodiments, and as shown in FIG. 2, the individual sheets will all have the same length so that when the sheets are placed side by side, the upper edge 201a and lower edge 201b of every sheet are aligned. When aligning each sheet 201 side by side, each sheet 201 is oriented so that the reinforcement materials 203 are all aligned from one sheet 201 to the next. More specifically, the sheets 201 are aligned so that the reinforcement materials 203 are aligned perpendicular to the direction the sheets 201 are arranged side by side. For example, FIG. 2 shows an embodiment in which the reinforcement materials 203 are aligned in parallel to each other and in a direction perpendicular to the direction the sheets 201 are arranged side by side. Ultimately, the individual belts formed from this bannered sheet 200 will have the reinforcement materials aligned in the non-bending direction of the belt. This allows the reinforcement material to increase the transverse modulus in compression of the ribs of the belt while reducing the longitudinal modulus in flexing of the belt, which provides higher load carrying capability while maintaining flexibility.

Any manner of attaching together adjacent segments during the bannering step 140 can be used. In some embodiments, adjacent segments are stitched or sewn together, though other attachment methods can be used, such as through the use of adhesive. The length and width dimensions of each segment attached together to form the new bannered sheet is generally not limited and will generally be selected based on the desired final dimensions for the belt product formed from the sheet material. The individual sheets bannered together can be identical in dimensions, or the width of each sheet can vary (the length is preferably the same between each sheet so that the upper and lower edges are aligned when the sheets are bannered together as discussed above and shown in FIG. 2).

Having now created the desired bannered sheet of material comprising the raw ingredients of step 110 and possessing anisotropic properties with respect to the modulus of elasticity, a step 150 of slab building the composite structure of the belt on a mold can be carried out. The slab building process generally entails sequentially providing each layer of the composite belt structure on the mold so that the mold can be enclosed and exposed to pressure and/or temperature to activate the curatives to form a close-to-finished belt product.

In some embodiments, the mold on which the slab build process is carried out is a cylindrical drum, the drum having a diameter approximately equal to the diameter of the belt being formed. The specific diameter is not limited and may be any diameter desired for a belt product.

In some embodiments, the first layer to be disposed on the drum mold is the backing material. Any backing material suitable for use in belt construction can be used. Similarly, the thickness of the backing material is not limited and may be adjusted based on the desired thickness for the backing layer of the resulting belt. In some embodiments, the backing material is a rubber material, though typically a rubber material different from the bannered sheet resulting from step 140. In other embodiments, the backing material may include one or more of a textile, adhesion rubber, and the like. Preferably the thickness of the backing material is reduced. The uniformity of the thin backing material enables the improved cord concentricity referred to previously.

Following the placement of the backing material on the drum mold, the slab build process will typically call for the cord material of the belt to be wound around the backing material on the cylindrical drum. A single layer of the cord is typically wound around the backing layer across the entire length of the backing material. Parameters such as the wind angle, wind tension and the spacing between adjacent winds of cord can be adjusted as desired for the finished product. The material of the cord wound around the drum mold is generally not limited, and in some embodiments, may include metal, aramid, carbon fiber, nylon, polyester, glass, ceramic and various composite materials and may include hybrid mixtures of materials. The dimensions of the cord itself (e.g., diameter) are not limited and may be selected based on the desired final application of the belt.

Following the wrapping of cord material around the backing material, the slab build process of step 150 includes wrapping the bannered sheet material resulting from step 140 around the drum mold and over the cord and backing material. One or more plies of the bannered sheet material may be applied to provide the total thickness for the rib material section of the belt made from the bannered sheet material, such as three plies (i.e., the bannered sheet material may be wrapped around the drum three times). An optional adhesion layer may be applied next to the cord before wrapping the bannered sheet material.

A final optional surface layer may then be applied over the bannered sheet material to finish off the slab build process of step 150. The surface layer may be any suitable surface layer material used in belt applications, such as knit tubes and polyethylene films. The thickness of the surface layer is generally not limited and may be adjusted based on the specific application of the belt being formed.

After the slab build process is completed, an outer mold may be applied to encase the composite belt structure between the inner (drum cylinder) and outer portions of the mold. The outer portion of the mold will generally be cylindrical in a manner that mirrors the drum cylinder so as to be able to encapsulate the composite belt structure and form a belt having a uniform thickness. The outer mold may have a planar inner surface in embodiments where the belt being formed does not have teeth, ribs or the like. Alternatively, the inner surface of the outer mold may include a profile that will create whatever teeth, ribs, etc., are desired for the belt product, including providing the generally desired dimensions, shapes and spacing for the ribs or teeth. In some embodiments, the high efficiency belt described herein includes ribs. The high efficiency belt described herein may include crosscuts, notches, and other types of surface modifications.

The outer surface of the inner mold can be used to add patterning to the backing of the belt, such as heat exchanger fins. For example, in some embodiments of the belt described herein, the manufacturing method includes a step in which finned heat exchanger elements are formed on the outer side of the backing material. These finned heat exchanger elements help dissipate heat away from the belt and further improve the performance of the belt and increase the temperature range in which the belt can be used. Any suitable finned elements, including in any pattern, can be used for heat dissipation. In some embodiments, the finned elements have a height of from about 0.2 to about 10 mm.

In step 160, a curing process is carried out in order to crosslink the polymer formulation, densify the product and provide the properties for performance. The curing process is generally not limited and can be similar or identical to known curing techniques, such as applying heat and/or pressure to activate the curatives in the material of the belt. In some embodiments, steam is specifically used for the curing step, though non-steam methods can also be used. As noted in the discussion of step 110, the belt may include curatives which aid in the curing process and crosslinking the polymer material to form a belt having the desired final material properties and dimensions.

In step 170, the belt material is removed from the mold by removing the outer mold portion and then sliding the cured belt material off the drum cylinder. The resulting product is an elongated cylinder of the composite belt structure. In order to form individual belts from this cylinder, the cylinder is cut transverse to the axis of the cylinder to form thinner rings of the belt material, with each ring having the desired width of the belt end product.

Finally, in step 180, any grinding and profiling required to get the individual belt segments to their final dimensions is carried out, if required. Any manner of grinding and/or profiling can be used. In some embodiments, grinding and/or profiling is carried out to, for example, adjust the thickness of the belt and/or refine the dimensions of any teeth or ribs formed in the belt. However, of particular note is the fact that based on the method for manufacturing a high efficiency belt described herein, the amount of machining and/or grinding required may be significantly reduced or eliminated as compared to previously known manufacturing methods.

Figure 3A:
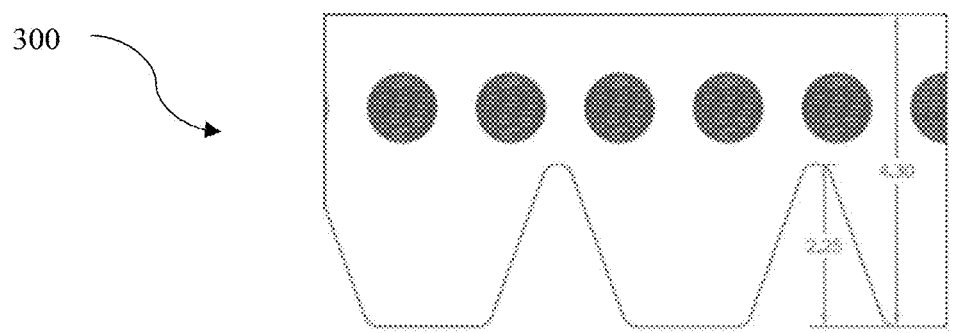
FIGS. 3A and 3B are a cross-sectional views of a previously known belt and a high efficiency belt in accordance with embodiments described herein, respectively.
Figure 3B:
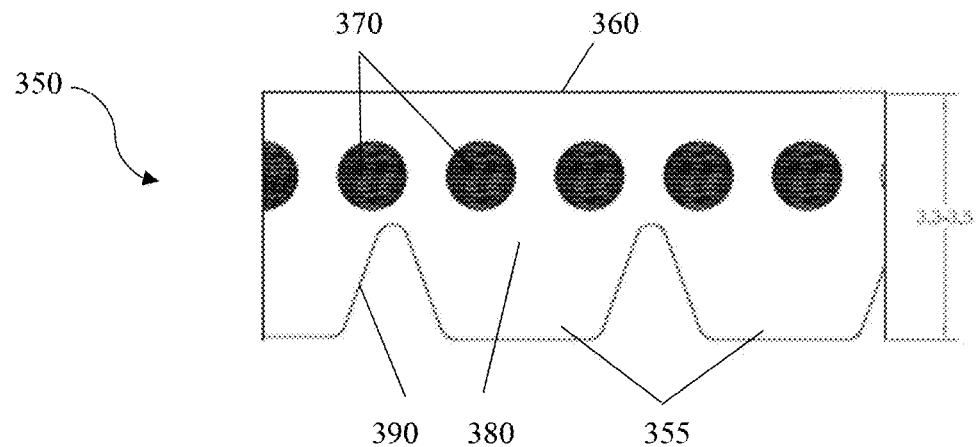

With reference to FIGS. 3A and 3B, a cross sectional view of a previously known belt 300 (FIG. 3A) and a belt 350 manufactured according to the method 100 (FIG. 3B) is shown. As illustrated in FIGS. 3A and 3B, the previously known belt has a larger overall thickness, such as about 4.3 mm, while the belt 350 as described herein can have a thickness in the range of, for example, about 3.2 to 3.5 mm. The belt 350 of the present technology can generally include a backing layer 360, cords 370, a rib material 380 (formed from multiple plies of the sheet material described above) and a surface layer 390. As shown in FIG. 3B, the belt 350 includes ribs 355, but it should be appreciated that the belt 350 may or may not include teeth, ribs, or similar types of surface modifications. The thickness reduction may be partly from a thinner backing layer and partly from shallower ribs. Most of the thickness reduction may be from shallower ribs.

The thickness of the belt described herein may vary based on the specific application for the belt. In some embodiments, the thickness of the belt varies between about 2.6 mm and about 4.2 mm. In some embodiments, the thickness of the belt is in the range of from about 3.0 to 3.8 mm, such as from about 3.2 to about 3.5 mm.

While the method 100 described previously and the belt configuration shown in FIG. 3B generally describe and illustrate a belt having a backing layer/cord/rib material layer/surface layer construction, it should be appreciated that alternate belt constructions incorporating the rib material described herein can also be used. For example, the belt construction can include rubber material (e.g., a rubber composition different from rib material) between cord and backing material (including when the backing material is made from a textile), the belt construction can include cross-cord material as the backing material, and/or the belt construction can include additional layers, such as an adhesion layer around the cord but which is distinct from the rib material.

Figure 4A:
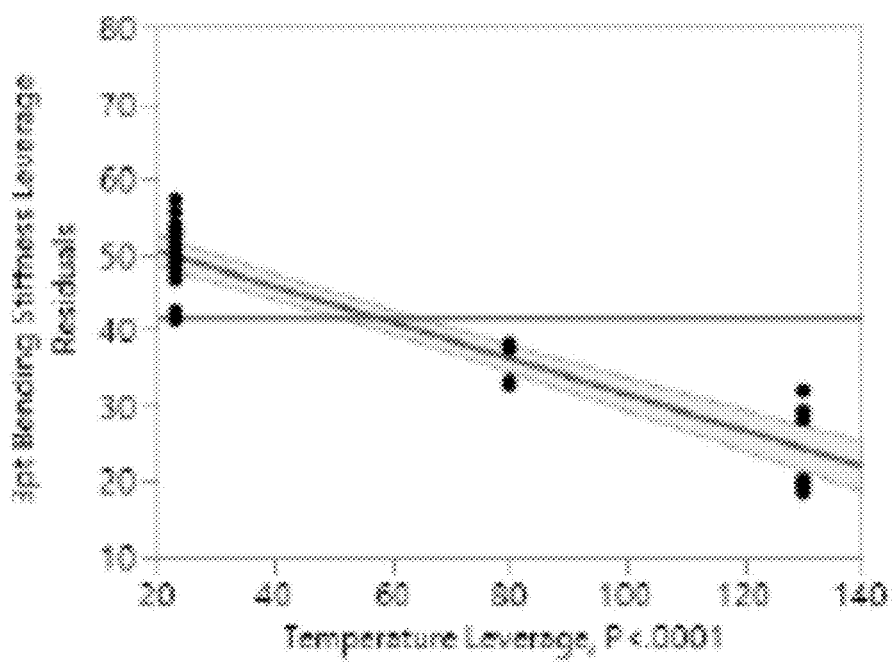
FIGS. 4A and 4B are graphs showing the effect of temperature and belt thickness on bending stiffness, respectively, in high efficiency belts in accordance with various embodiments described herein.
Figure 4B:
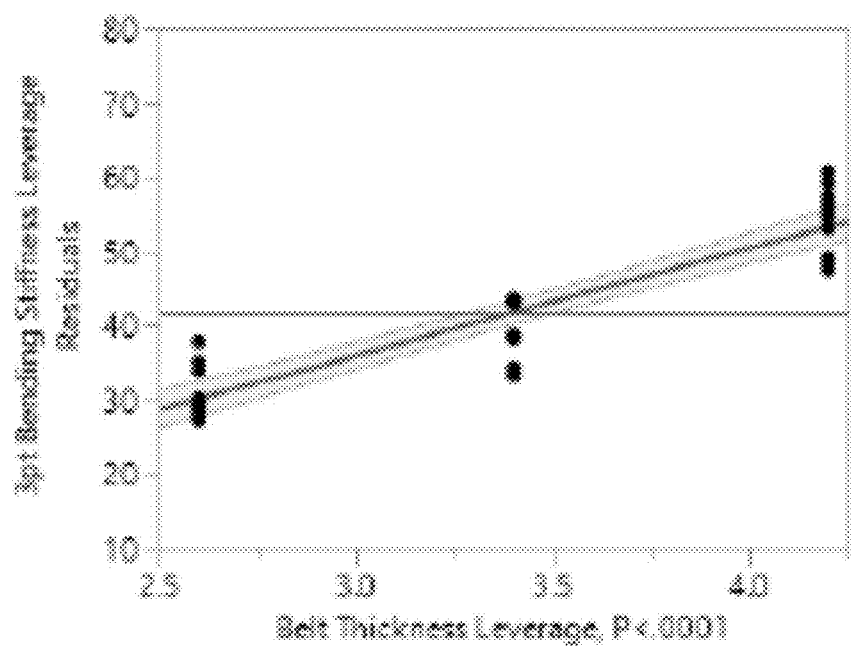

With reference to FIGS. 4A and 4B, the belts described herein and manufactured according to the methods and materials described herein will have variable bending stiffness based on parameters such as temperature and belt thickness. Referring specifically to FIG. 4A, a graph showing the measured relationship between bending stiffness and temperature for a 4.2 mm thick belt shows how as temperature increases, the bending stiffness of the belt decreases. With reference to FIG. 4B, a graph showing the relationship between bending stiffness and belt thickness shows how the bending stiffness increases as the belt thickness increases. This generally suggests that thinner belts are desirable, as the corresponding reduced bending stiffness should make the belt easier to turn. However, and as discussed in greater detail below, reduced thickness can also lower the coefficient of friction (COF) of the belt, which is a measure of the belts ability to transfer torque. Accordingly, this reduction in COF is generally not desirable, as it makes the belt less able to transfer torque, and therefore additional power may be required for the belt to turn a pulley. As also mentioned previously, reduced belt thickness can also reduce the durability of a belt. Thus, simply reducing the belt thickness generally does not solve the problem of providing a high efficiency belt.

Figure 5A:
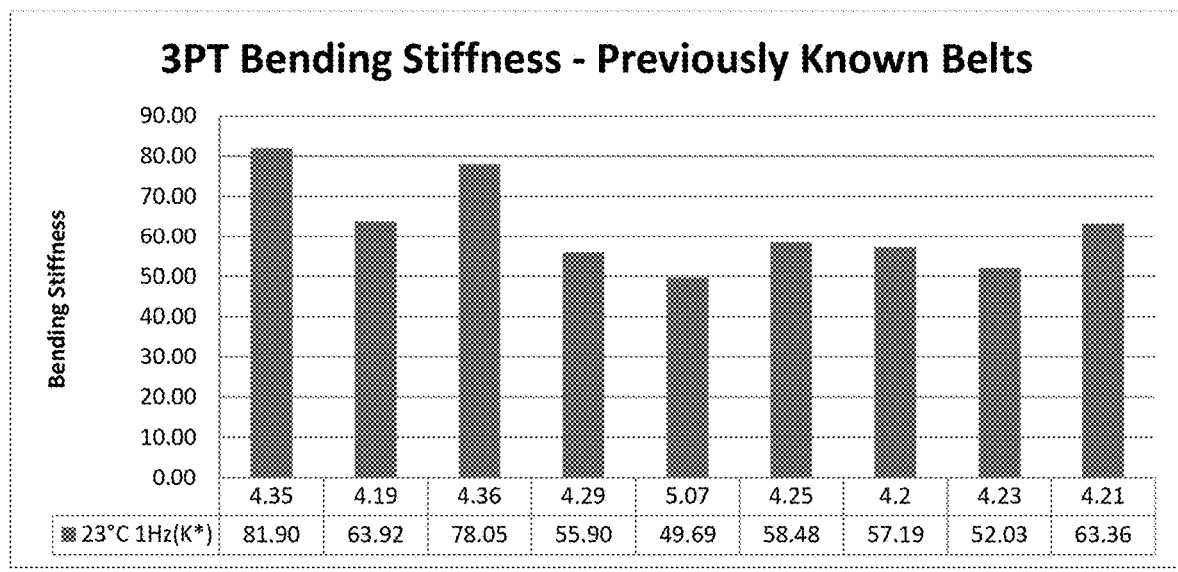
FIGS. 5A and 5B are bar graphs showing the bending stiffness of previously known belts of various thicknesses (in mm), and the bending stiffness of belts of various thicknesses (in mm) in accordance with various embodiments disclosed herein, respectively.
Figure 5B:
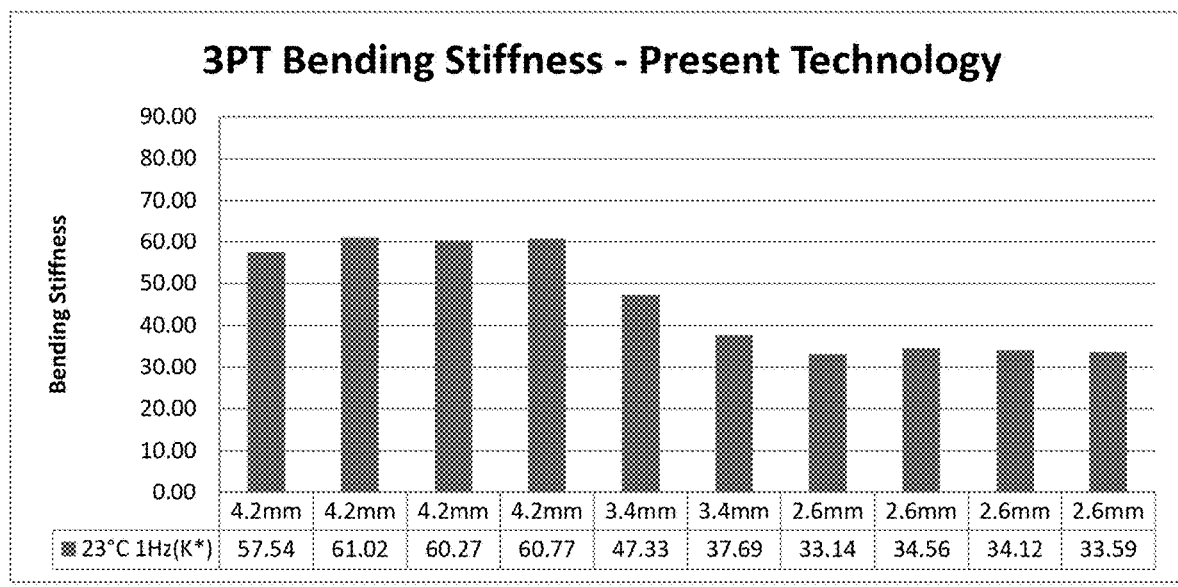

FIGS. 5A and 5B further illustrate how the belt as described herein have comparable bending stiffness as compared to previously known belts of similar thicknesses, and how belts as described herein having reduced thickness compared to previously known belts can have improved bending thickness. FIG. 5A illustrates bending stiffness measurements for various previously known belts, each having a thickness in the range of from about 4.2 mm to about 5.0 mm. As can be seen, the bending stiffness of these previously known belts ranges from about 50 N/mm to about 80 N/mm. For the previously known belts having a bending stiffness on the higher end of this range, more power is required to turn the belts, thereby making these belts less energy efficient. Previously known belts generally did not use smaller thicknesses because while it was appreciated that the thinner belts could provide reduced bending stiffness and therefore improved power transmission efficiency, the reduced thickness of these belts degraded the service life of the belts to an unacceptable level and negatively impacted the torque transfer performance of the belts.

FIG. 5B illustrate bending stiffness measurements for various belts manufactured and structured in accordance with the embodiments described herein. The belts tested have three different thicknesses: 4.2 mm (similar to previously known belts); 3.4 mm, and 2.6 mm. As can be seen, the range of bending stiffness for the 4.2 mm belts is generally in the range of from about 55 to 65 N/mm, and are therefore comparable to the performance of previously known belts having a similar thickness. At the 3.4 mm thickness, the range of bending stiffness was in the range of from about 35 N/mm to about 50 N/mm. At the 2.6 mm thickness, the range of bending stiffness was in the range of from about 30 to 35 N/mm. Accordingly, these thinner belts have superior bending stiffness measurements from the perspective of improved power transmission efficiency.

Figure 6:
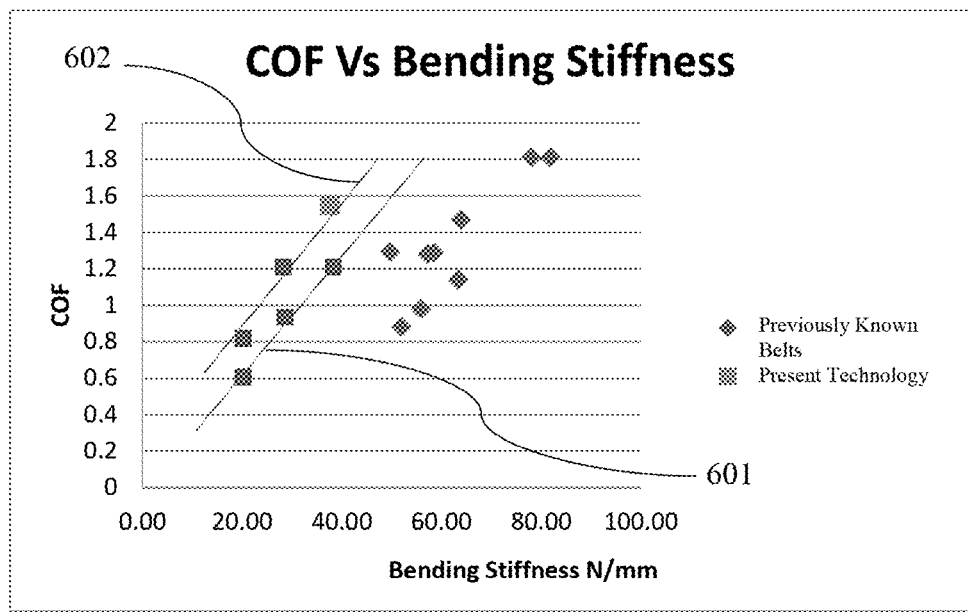
FIG. 6 is a graph showing the relationship between bending stiffness and coefficient of friction for previously known belts and belts in accordance with various embodiments described herein.

FIG. 6 shows the bending stiffness of previously known belts plotted against each belt's effective coefficient of friction (COF). All previously known belts shown in FIG. 6 have a thickness generally in the range of 4.2 mm, and therefore achieve reduced bending stiffness through adjustments in, e.g., material selections and quantities. The data points for the previously known belts (shown in diamond plot points) show how the COF decreases with decreased bending stiffness, thus exhibiting how there is traditionally a negative consequence associated with reducing bending stiffness (i.e., reduced bending stiffness theoretically makes the belt easier to turn, but the reduced COF means the belt is less efficient at transferring torque to a pulley). The data points for the previously known belts also show how the previously known belts generally adhere to a relationship between the coefficient of friction and the bending stiffness in which the coefficient of friction is less than or equal to about 0.02 mm/N times the bending stiffness.

In contrast, the data shown in the graph of FIG. 6 for the belts as described herein illustrates how relatively high COF values are achieved even at reduced bending stiffness. In other words, the belts as described herein generally overcome the issue of reduced bending thickness also resulting in undesirable reduced COF. In some embodiments, the belts described herein have a COF that is greater than or equal to 0.03 mm/N times the bending stiffness of the belt, such as a COF that is greater than or equal to 0.04 mm/N times the bending stiffness. FIG. 6 includes a trend line 601 for COF values equal to 0.03 mm/N times the bending stiffness and a trend line 602 for COF values equal to 0.04 mm/N times the bending stiffness. In some embodiments, the COF value is greater than 0.03 mm/N times the bending stiffness, less than 0.06 mm/N times the bending stiffness or less than 0.05 mm/N times the bending stiffness. This relationship between COF and bending stiffness exhibits how the belts as described herein provide reduced bending stiffness while maintaining high COF (as compared to previously known belts at similar bending stiffness) to thereby provide a high efficiency belt. The high efficiency belts described herein that adhere to this relationship avoid requirements for additional power to deal with either high bending stiffness or reduced COF as experienced in prior art belts.

FIG. 7 is chart that further illustrates the improved performance of belts as described herein as compared to previously known belts. The chart compares high efficiency belts as described herein versus previously known belts of the same thickness in terms of power losses experienced at various pulley diameters. As shown in FIG. 7, the power loss increases as the pulley diameter decreases for both belts, but the power loss is significantly less in the high efficiency belt than the previously known belt at each pulley diameter.

Various benefits can be achieved by the high efficiency belt and methods of manufacturing described herein. For example, the high efficiency belt described herein can be provided at a thickness less than previously known belts (e.g., 3.0 mm to 3.8 mm as compared to previously known belts having a thickness of about 4.2 mm) without suffering from reductions in performance (e.g., without reducing torque transfer). By reducing belt thickness, less material is used in the belt, meaning the belt has less mass. In some embodiments, belts as described herein have 5 to 40% less mass than previously known belts while performing comparably to or better than previously known belts. The reduction in material and mass both contribute to the belt being more efficient in terms of requiring less energy to turn. Significantly, the belts of reduced thickness provide similar or equivalent durability as thicker previously known belts while still exhibiting comparable or better energy efficiency. The reduced thickness belt also produces less waste, which means less material ends up in a landfill. Similarly, there are reduced disposal costs associated with the belt described herein because of the reduced mass of the belt.

The belt of the present application also exhibits improved bending stiffness (e.g., by virtue of a thinner belt) that further contributes to the improved efficiency of the belt. As mentioned previously, this reduced bending stiffness characteristics is achieved while still maintaining a high coefficient of friction, meaning the belt is both easy to bend and turn and provides good torque transfer characteristics. This combination provides a high efficiency belt requiring reduced power in use.

Another feature of the belt disclosed herein may be the improved cord concentricity. Cord concentricity generally refers to offset from a center line each cord may be. In some previously known belts, cord concentricity may be 0.30 mm or higher, meaning each cord within the belt may be offset from a center line (and therefore other nearby cords) by as much as 0.30 mm. In the presently described belt, cord concentricity is generally limited to 0.1 to 0.2 mm, thereby providing much more aligned cords within the belt.

The belt described herein also has an improved operational temperature range. In some embodiments, the belt may be used at a temperature range of from −40° C. to 130° C. While the materials will still begin to degrade at a known temperature above the ambient surroundings, the reduction in hysteretic heat generation allows the belt to operate with a lower delta in temperature, which will allow the ambient temperatures to be increased. Additionally, the thinner belts described herein exhibit less hysteretic heat generation and run cooler. The thinner belt is also easier to cool, which further contributes to the increase energy efficiency of the belt. The thinner cross-section also provides a belt that has better strain at the ends of the belt and thereby provides yet another characteristic that result in better energy efficiency.

Other characteristics of the belt contributing to increased energy efficiency include less flex fatigue, lower hysteresis build up, and lower reinforcement requirements for equivalent performance.

The improved energy efficiency exhibited by the belt described herein also allows system design and application improvements. The thin design and lower bending stiffness allow for improved flexibility enabling smaller bend radii pulleys. Smaller pulleys radii will improve packaging requirements, reduce system mass, and inertial loads. The thin construction can operate at higher rotational speeds. Cost savings are thus realized by virtue of and corresponding weight and packaging reductions.

The design of the belt described herein using a thinner cross section provides the above described improvement in energy efficiency without a significant impact in durability. In some embodiments, the improved cooling of the belt described previously helps to maintain a durable belt. The belt is also capable of utilizing shorter tooth height, which leads to lower strain energy density and, consequently, less crack generation. The belt described herein also exhibits longer duration in start-stop applications.

The belt construction described herein can also provide benefits such as the ability to use alternate reinforcement materials, such as, but not limited to, aramid, glass, carbon fiber cords, hybrid cords, metal, ceramic, and plastic.

Other advantages pertaining to the construction of the belt disclosed herein include the use of thinner tensile layers, the implementation of materials with a lower strain modulus, and reduced misalignment of cords based on the thinner profile of the belt.

Bending Stiffness and Coefficient of Friction

Bending stiffness of the belt, as referred to in this specification and in the claims, may be measured in a three-point dynamic bending test on a section of belt. Herein, all the reported stiffness results are based on testing a 6-rib belt on a dynamic mechanical tester at room temperature, at 1 Hz frequency, with a 5-N preload, in constant deflection mode with 0.25 mm deflection. The bending stiffness results are the dynamic stiffness, $K^*$, expressed herein in N/mm. The specimen may be cut from the belt. The tests herein used a 3-inch (75-mm) long belt specimen and the two supports for the bending stiffness test were 2 inches (50 mm) apart.

Figure 8:
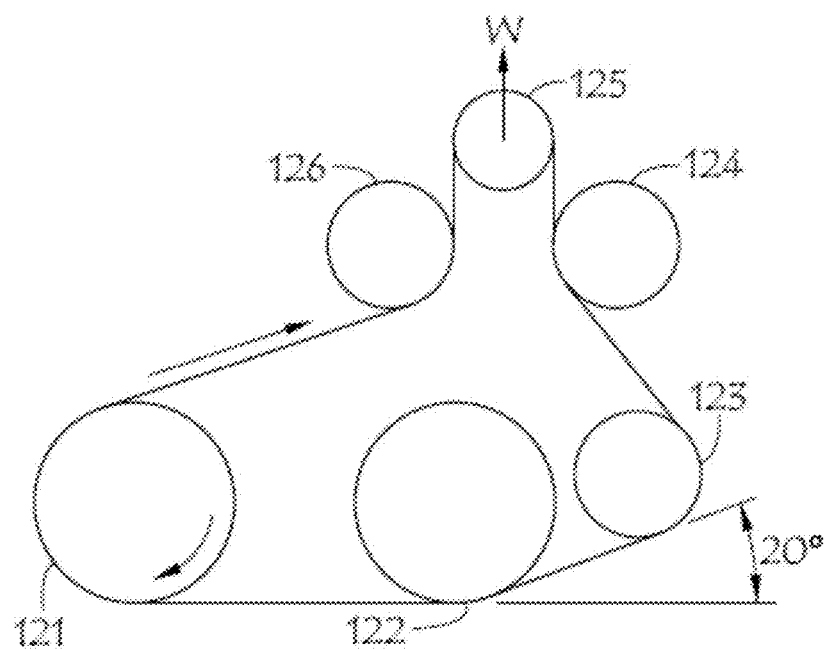
FIG. 8 depicts a coefficient of friction (COF) test pulley configuration.

Effective coefficient of friction, or COF, as referred to in this specification and in the claims, may be measured in accordance with the standardized test procedure described by SAE J2432, MAR2015, "Performance Testing of PK Section V-Ribbed Belts," § 10. FIG. 8 illustrates the COF test layout. Referring to FIG. 8, driven test pulley 122 and driver pulley 121 both have a multi-v-rib profile and diameter of 121.6 mm. Pulleys 123, 124, and 126 are idlers. Pulleys are positioned to maintain a 20-degree wrap angle on driven pulley 122. Driver pulley 121 is turned at 400 rpm. Weight W of 360 N is applied to pulley 125 to provide a slack side belt tension of 180 N at pulley 125. Torque is applied to test pulley 122, ramping up from zero torque until the pulley stops turning. The COF is calculated from the maximum torque observed. It should be understood, the test measures an effective coefficient of friction on the belt, which does not numerically match the theoretical friction coefficients.

EXAMPLES

Various embodiments of the technology described herein are set forth in the following non-limiting examples.

Example 1

A ribbed high efficiency belt, comprising:
a backing layer;
a rib material layer disposed on the backing layer;
a plurality of cords embedded within the rib material; and
a plurality of ribs formed on a face of the belt opposite the backing layer;
wherein the coefficient of friction of the high efficiency belt is greater than or equal to 0.03 mm/N times the bending stiffness of the high efficiency belt; and
wherein the thickness of the high efficiency belt is less than about 3.8 mm.

Example 2

The high efficiency belt of Example 1, wherein the coefficient of friction of the high efficiency belt is greater than or equal to 0.04 mm/N times the bending stiffness of the high efficiency belt.

Example 3

The high efficiency belt of any preceding Example, wherein the thickness of the high efficiency belt is from about 3.0 mm to about 3.8 mm.

Example 4

The high efficiency belt of any preceding Example, wherein the coefficient of friction of the high efficiency belt is greater than or equal to 0.03 mm/N times the bending stiffness of the high efficiency belt and less than or equal to 0.05 mm/N times the bending stiffness of the high efficiency belt.

Example 5

The high efficiency belt of any preceding Example, wherein the thickness of the high efficiency belt is about 3.4 mm and the bending stiffness in the range of about 35 N/mm to about 50 N/mm.

Example 6

The high efficiency belt of any preceding Example, wherein the material of the rib material layer comprises:
about 30 wt. % to about 70 wt. % rubber stock;
about 5 wt. % to about 30 wt. % reinforcement material; and
about 5 wt. % to about 45 wt. % filler.

Example 7

The high efficiency belt of any preceding Example, wherein the rubber stock is selected from the group consisting of natural rubber, styrene-butadiene rubber (SBR), chloroprene rubber (CR), ethylene propylene diene monomer rubber (EPDM) or other ethylene elastomer copolymers, hydrogenated nitrile butadiene rubber (HNBR), fluoroelastomers, and combinations thereof.

Example 8

The high efficiency belt of any preceding Example, wherein the reinforcement material comprises elongated segments and the elongated segments are aligned in parallel with one another within the rib material.

Example 9

The high efficiency belt of any preceding Example, wherein the elongated segments are chopped fiber segments.

Example 10

The high efficiency belt of any preceding Example, wherein the parallel aligned reinforcement material is aligned transverse to the direction of rotation of the high efficiency belt.

Example 11

The high efficiency belt of any preceding Example, wherein the filler is selected from the group consisting of carbon black, clays, pulps, silicas, and combinations thereof.

Example 12

The high efficiency belt of any preceding Example, wherein the high efficiency belt has an anisotropic modulus of elasticity.

Example 13

The high efficiency belt of claim any preceding Example, wherein the modulus of elasticity in the direction in which the reinforcement material is aligned is greater than the modulus of elasticity in the direction transverse to the direction in which the reinforcement material is aligned.

Example 14

The high efficiency belt of any preceding Example, wherein the ratio of the modulus of elasticity in the direction in which the reinforcement material is aligned to the modulus of elasticity in the direction transverse to the direction in which the reinforcement material is aligned is in the range of from 1.1 and 5.0.

Example 15

A method of manufacturing a rib layer material for a high efficiency belt, comprising:
mixing rubber stock, reinforcement material, filler and curative to form a mixture, wherein the reinforcement material comprises elongated segments;
forming a sheet from the mixture;
processing the sheet to align in parallel the elongated segments of the reinforcement material and form an anisotropic sheet; and
bannering together two or more anisotropic sheets.

Example 16

The method of Example 15, wherein the mixture comprises:
about 30 wt. % to about 70 wt. % rubber stock;
about 5 wt. % to about 30 wt. % reinforcement material; and
about 5 wt. % to about 45 wt. % filler.

Example 17

The method of Example 15 or 16, wherein the elongated segments of reinforcement material comprise chopped fibers, and wherein processing the sheet to align in parallel the elongated segments of the reinforcement material and form an anisotropic sheet comprises calendering the sheet.

Example 18

The method of any of Examples 15-17, wherein bannering together two or more anisotropic sheets comprises placing a two anisotropic sheets side by side wherein the elongated segments of the reinforcement material are aligned in parallel to each other and in a direction perpendicular to the direction the anisotropic sheets are arranged side by side, and securing the two anisotropic sheets together.

Example 19

The method of any of Examples 15-18, wherein the rib layer material is incorporated into a high efficiency belt.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A multi-V-ribbed high efficiency belt, comprising:
a backing layer;
a rib material layer disposed on the backing layer;
a plurality of cords embedded within the rib material; and
a plurality of ribs formed on a face of the belt opposite the backing layer;
wherein the coefficient of friction of the high efficiency belt is greater than or equal to 0.03 mm/N times the bending stiffness of the high efficiency belt;
wherein the thickness of the high efficiency belt is less than about 3.8 mm; wherein the material of the rib material layer comprises:
about 30 wt. % to about 70 wt. % rubber stock, about 5 wt. % to about 30 wt. % reinforcement material, and about 5 wt. % to about 45 wt. % filler;
wherein the reinforcement material comprises elongated segments and the elongated segments are aligned in parallel with one another within the rib material;
wherein the parallel aligned reinforcement material is aligned transverse to the ribs of the high efficiency belt;
wherein the high efficiency belt has an anisotropic modulus of elasticity; and
wherein the ratio of the modulus of elasticity in the direction in which the reinforcement material is aligned to the modulus of elasticity in the direction transverse to the direction in which the reinforcement material is aligned is in the range of from 1.1 to 5.0.

2. The high efficiency belt of claim 1, wherein the thickness of the high efficiency belt is from about 3.0 mm to about 3.8 mm.

3. The high efficiency belt of claim 1, wherein the wherein the coefficient of friction of the high efficiency belt is less than or equal to 0.05 mm/N times the bending stiffness of the high efficiency belt.

4. The high efficiency belt of claim 1, wherein the thickness of the high efficiency belt is about 3.4 mm and the bending stiffness in the range of about 35 N/mm to about 50 N/mm.

5. The high efficiency belt of claim 1, wherein the rubber stock is selected from the group consisting of natural rubber, styrene-butadiene rubber (SBR), chloroprene rubber (CR), ethylene propylene diene monomer rubber (EPDM), hydrogenated nitrile butadiene rubber (HNBR), ethylene elastomer copolymers, fluoroelastomers, and combinations thereof.

6. The high efficiency belt of claim 1, wherein the elongated segments are chopped fiber segments.

7. The high efficiency belt of claim 1, wherein the filler is selected from the group consisting of carbon black, clays, pulps, silicas, and combinations thereof.

8. The high efficiency belt of claim 1 wherein the rib material layer further comprises multiple calendered layers of the material making up the rib material layer.

9. The high efficiency belt of claim 1 wherein the rib material layer further comprises at least three layers of the material making up the rib material layer.

10. A method of manufacturing a rib layer material for a high efficiency multi-V-ribbed belt, comprising:
mixing rubber stock, reinforcement material, filler and curative to form a mixture, wherein the reinforcement material comprises elongated segments;
forming a sheet from the mixture;
processing the sheet to align in parallel the elongated segments of the reinforcement material and form an anisotropic sheet;
and bannering together two or more anisotropic sheets;
wherein the mixture comprises:
about 30 wt. % to about 70 wt. % rubber stock, about 5 wt. % to about 30 wt. % reinforcement material, and about 5 wt. % to about 45 wt. % filler;
wherein the anisotropic sheets are incorporated into the high efficiency multi-V-ribbed belt as the rib layer material;
wherein the parallel aligned elongated segments are aligned transverse to the ribs of the high efficiency multi-V-ribbed belt;
wherein the high efficiency multi-V-ribbed belt has an anisotropic modulus of elasticity;
wherein the ratio of the modulus of elasticity in the direction in which the elongated segments are aligned to the modulus of elasticity in the direction transverse to the direction in which the elongated segments are aligned is in the range of from 1.1 to 5.0; and
wherein the coefficient of friction of the high efficiency belt is greater than or equal to 0.03 mm/N times the bending stiffness of the high efficiency multi-V-ribbed belt.

11. The method of claim 10, wherein the elongated segments of reinforcement material comprise chopped fibers, and wherein processing the sheet to align in parallel the elongated segments of the reinforcement material and form an anisotropic sheet comprises calendering the sheet.

12. The method of claim 11 wherein said calendering reduces the sheet thickness to 0.5 to 1.5 mm in thickness.

13. The method of claim 12 wherein said calendering includes unequal roller speeds to shear the sheet.

14. The method of claim 13 wherein multiple layers of the anisotropic sheets are incorporated into the high efficiency multi-V-ribbed belt as the rib layer material.

15. The method of claim 13 wherein at least three layers of the anisotropic sheets are incorporated into the high efficiency multi-V-ribbed belt as the rib layer material.

16. The method of claim 10, wherein bannering together two or more anisotropic sheets comprises placing a two anisotropic sheets side by side wherein the elongated segments of the reinforcement material are aligned in parallel to each other and in a direction perpendicular to the direction the anisotropic sheets are arranged side by side, and securing the two anisotropic sheets together.

* * * * *